No. 735,231.

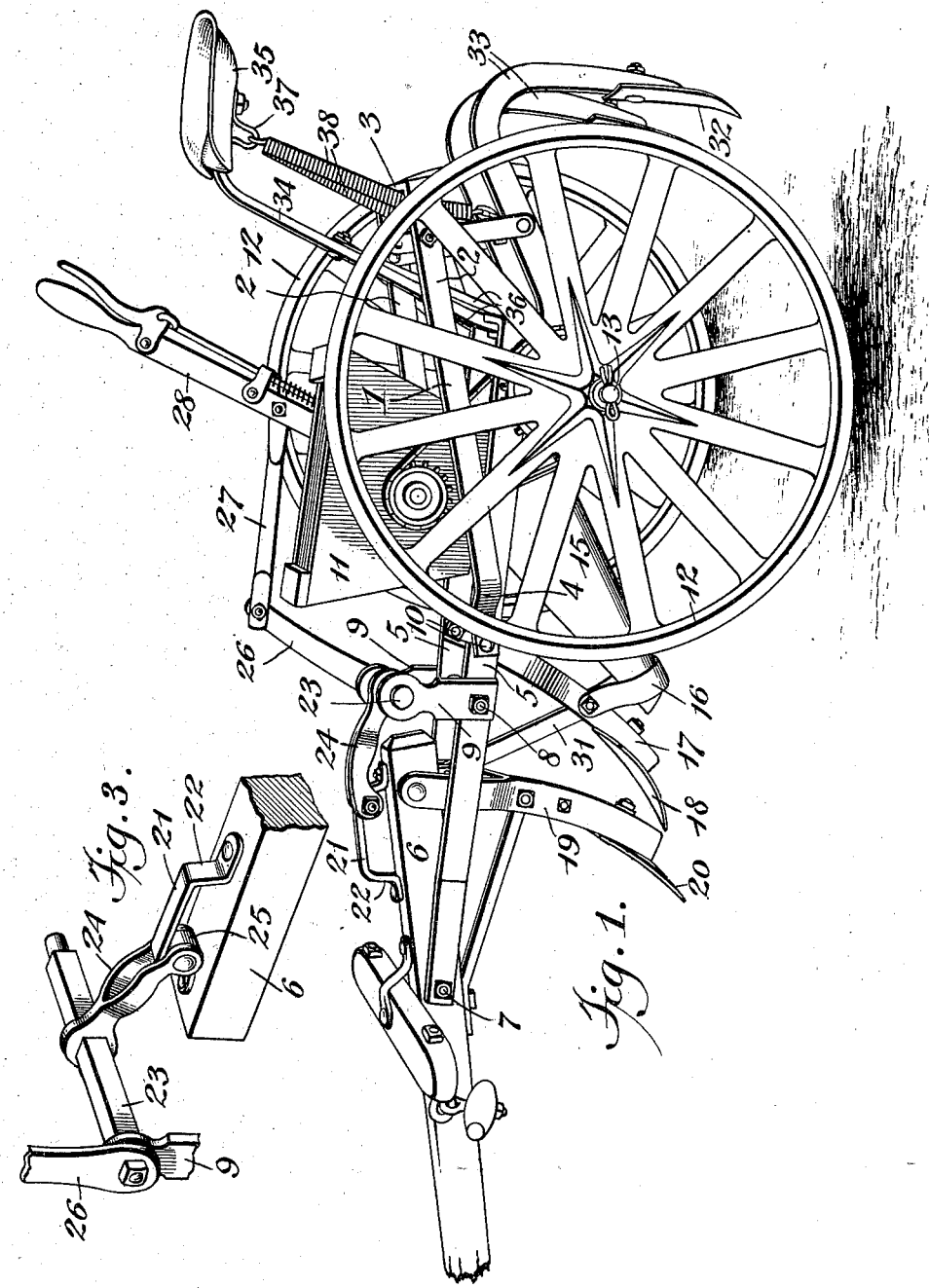

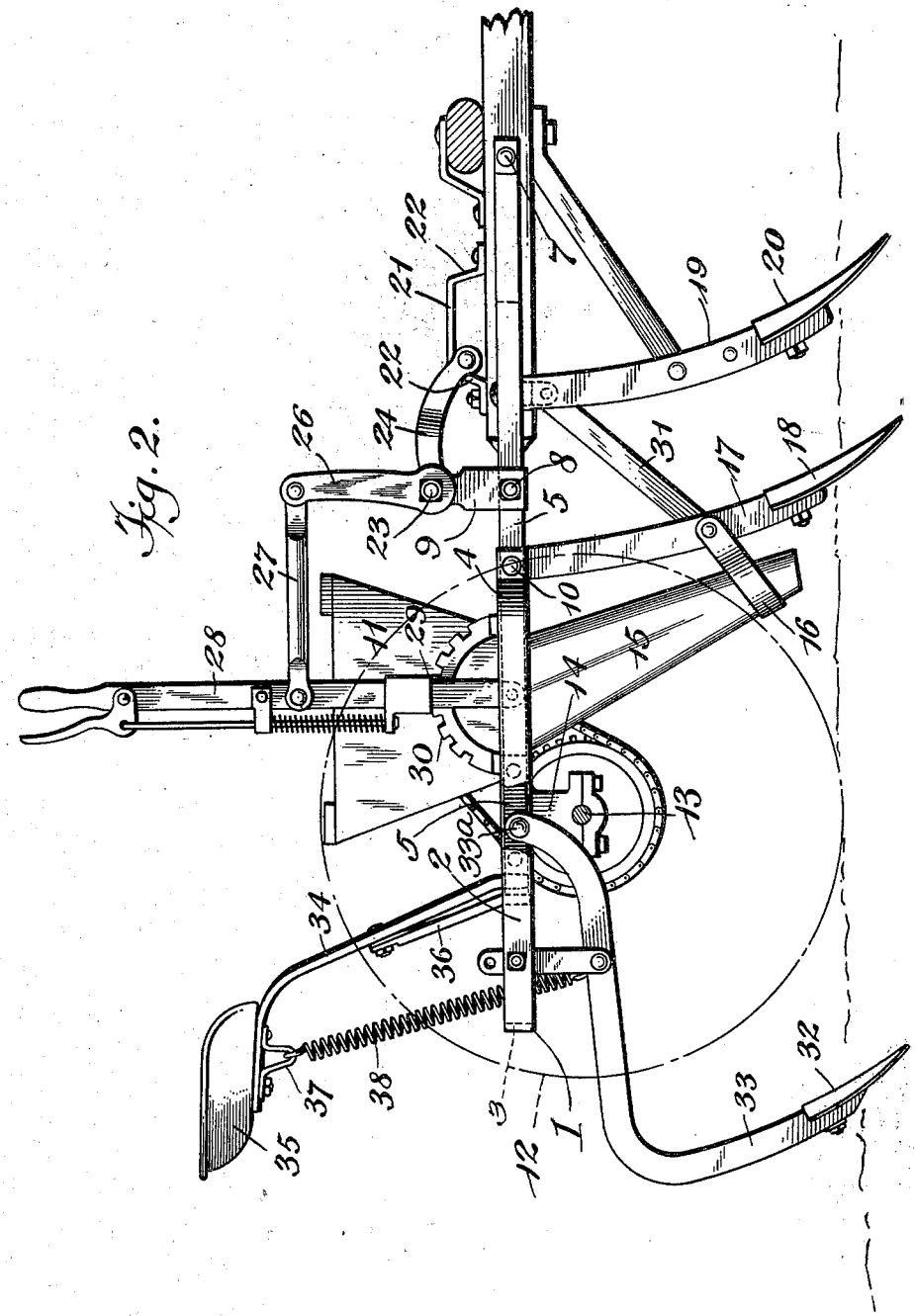

Patented August 4, 1903.

UNITED STATES PATENT OFFICE.

CHARLES L. FERRIOTT, OF BARTLETT, TEXAS.

SEED-PLANTER.

SPECIFICATION forming part of Letters Patent No. 735,231, dated August 4, 1903.

Application filed May 20, 1903. Serial No. 158,023. (No model.)

*To all whom it may concern:*

Be it known that I, CHARLES L. FERRIOTT, a citizen of the United States, residing at Bartlett, in the county of Williamson and State of Texas, have invented a new and useful Seed-Planter, of which the following is a specification.

This invention relates to seed-planters, and especially to riding planters for planting cotton, corn, and other seeds.

My present invention has for its object to provide a simple, convenient, and easily-operated means whereby the front plow or furrow-opener and an auxiliary furrow-opener connected with the seed-tube of the device may be easily and simply operated to raise the same from or to force the same into the ground, as may be required.

A further object of my invention is to provide an improved supporting means for the rear plows or coverers and means whereby the latter may be depressed or forced into the ground at the will of the driver and under his entire control, so that, especially when rough and uneven places occur, the said covering-plows shall be entirely under the control of the driver.

With these and other ends in view, all tending to produce a device of the class referred to which shall possess superior advantages in point of simplicity, durability, and general efficiency, the invention consists in the improved construction, arrangement, and combination of parts which will be hereinafter fully described, and particularly pointed out in the claims.

In the accompanying drawings, Figure 1 is a perspective view of a planter constructed in accordance with the principles of my invention. Fig. 2 is a longitudinal sectional elevation. Fig. 3 is a perspective detail view showing the rock-shaft 23, the rear end of the tongue, and related parts.

Corresponding parts in the several figures are indicated by similar numerals of reference.

1 designates a frame of my improved planter, which is composed of side pieces 2 2 and a rear connecting cross-bar 3, which may be bent integrally from a single strap of iron of suitable dimensions. The front ends of the side pieces are shouldered, as shown at 4, and they are pivotally mounted upon the main frame, which is composed of side pieces 5 5, which converge forwardly and between the front ends of which the tongue 6 is pivotally mounted upon a bolt 7. The side pieces 5 are connected in rear of the tongue by means of a bolt 8, which also serves for the attachment of a pair of uprights or brackets 9. The main frame is furthermore connected with the auxiliary frame by means of pivotal bolts 10, whereby the side pieces 5 are connected with the side pieces 2 of the auxiliary frame, said side pieces extending somewhat in a rearward direction between the side pieces of said auxiliary frame, so as to support the seed-hopper 11, which contains seed mechanism (not shown) to which motion may be imparted in any suitable manner from one of the transporting-wheels of the device. Said transporting-wheels 12 are mounted upon an axle 13, which is journaled in brackets or hangers 14, depending from the sides of the main frame.

Depending from the hopper 11 in a forward direction is a seed-spout 15, which is surrounded by a yoke or loosely-mounted clip 16, which is connected pivotally with a standard 17, the upper end of which is forked and the forked members being connected pivotally with the bolts 10, which connect the side pieces of the main frame with the sides of the auxiliary frame of the device. The standard 17 carries at its lower end an auxiliary furrow-opener 18, which travels directly in front of the opening at the lower end of the seed-spout, thereby causing the seed to be guided unfailingly into the furrow. Another standard, 19, carrying the main furrow-opener 20, is suitably connected with the rear end of the tongue. The tongue carries upon its upper side, near its rear end, a guide-bar 21, supported by short legs 22 above the tongue. Suitably journaled in the brackets 9 is a rock-shaft 23, having a forked arm 24, which straddles the guide-bar 21 and is provided with a pulley or roller 25, journaled between its side members and engaging the under side of the guide-bar 21, with which the forked arm 24 is thus connected. The rock-shaft 23 has an upwardly-extending crank-arm 26, which is connected by a link 27 with an operating-lever 28, which is fulcrumed to one of the side bars 5 of the main frame and which is provided with a spring-actuated dog or pawl 29, adapted to engage a segment-rack 30, which is permanently secured to the side bar 5 of the auxiliary frame, with which the operating-lever is pivotally connected. The rear end of the tongue is connected, by means of a link-rod 31, with the standard 17, carrying the auxiliary furrow-opener 18, thereby establishing between the main furrow-opener, which is connected, as described, with the rear end of the tongue, and the auxiliary furrow-opener a connection whereby they may be similarly set and operated.

It will be observed that by manipulating the lever 28 to throw its upper end in a forward direction the intermediate connections will bear downwardly upon the rear end of the tongue, consequently setting the furrow-opener connected therewith, and also the auxiliary furrow-opener, into the ground. By a reverse movement of the lever the furrow-openers may be elevated, as will be readily understood.

A pair of covering devices, which are designated 32, are mounted upon standards 33, which have pivotal connection with the main frame or with some member permanently connected with the main frame—for instance, by bolts 33ª, as indicated in the drawings. The main frame, or some part permanently connected therewith, also supports a seat-bar 34 and seat 35, the seat-bar being additionally connected with the sides of the frame by means of supporting-braces 36. The under side of the seat 35 is provided with a loop the end 37 of which is connected, by means of springs 38 with the standards 33, said springs being of such force as to support the standards of the coverers connected with the same normally above the ground. When the machine is in operation and the driver occupies the seat, he may exert downward pressure upon the standards 33 with his feet, thereby depressing them sufficiently to cause the covering-blades to throw the loose soil excavated by the furrow-openers back into the furrow, thus covering the seed. It is obvious that to perform this operation but little pressure is required and that the covering devices may thus be operated with but slight exertion on the part of the operator.

From the foregoing description, taken in connection with the drawings hereto annexed, the operation and advantages of my invention will be readily understood. The construction of the device is extremely simple, and it is easily operated and productive of the best results.

I do not limit myself to the precise construction herein shown, but reserve the right to any changes, alterations, and modifications that may fall within the scope of my invention.

Having thus described my invention, I claim—

1. In a seed-planter, a frame, an auxiliary frame pivotally connected therewith, a tongue pivotally connected with the main frame, a furrow-opener connected with the tongue, and adjusting means.

2. In a seed-planter, a main frame, an auxiliary frame pivotally connected therewith, a hopper, a seed-tube supported by the main frame, a forked standard mounted upon the bolts which pivotally connect the main and auxiliary frames, an auxiliary furrow-opener upon said planter, connecting means between the latter and the seed-tube, a tongue pivotally connected with the main frame, and connecting means between said tongue and the standard carrying the auxiliary furrow-opener.

3. In a seed-planter, the combination of a main frame, an auxiliary frame pivotally connected therewith, a seed hopper and spout supported upon said main frame, a tongue pivotally connected with the latter, a standard having a furrow-opener connected with the tongue, a bifurcated standard mounted upon the bolts which pivotally connect the main and auxiliary frames, an auxiliary furrow-opener upon said standard, connecting means between the auxiliary standard and the tongue, a yoke connected with the auxiliary standard and engaging the seed-tube, and adjusting means.

4. In a seed-planter, the combination of a frame, an auxiliary frame connected pivotally therewith, a tongue connected pivotally with said main frame, standards connected with the tongue and with the auxiliary frame and having furrow-openers, a rock-shaft supported in bearings upon the main frame, an arm upon said rock-shaft for flexible connection with the tongue, and means for operating said rock-shaft.

5. In a seed-planter, the combination of a main frame, an auxiliary frame pivotally connected therewith, a tongue connected pivotally with the main frame, a standard carried by said tongue and having a furrow-opener, a bifurcated standard mounted pivotally upon the bolts connecting the main and auxiliary frames and having an auxiliary furrow-opener, connecting means between the tongue and the standard carrying the auxiliary furrow-opener, a rock-shaft mounted in bearings upon the main frame, a guide-bar upon the rear end of the tongue, an arm connected with the rock-shaft and having slidable connection with said guide-bar, a crank upon the rock-shaft, and means for manipulating and adjusting the latter through the medium of said crank.

6. In a seed-planter, a wheel-supported main frame, an auxiliary frame pivotally connected therewith, a hopper having a seed-spout supported upon the main frame in rear of its pivotal connection with the auxiliary frame, a tongue connected pivotally with the main frame, a furrow-opener carried by the tongue, an auxiliary furrow-opener, a forked standard for the latter having pivotal connection with the pivotal connecting-points of the auxiliary and main frames, connecting means between the auxiliary furrow-opener and the rear end of the tongue, a rock-shaft supported in bearings upon the main frame, a guide upon the rear end of the tongue, an arm upon the rock-shaft having sliding connection with said guide, a crank upon the rock-shaft, an operating-lever, means for retaining the latter in adjusted position, and a link connection between the operating-lever and the crank upon the rock-shaft.

7. In a seed-planter, the combination of a wheel-supported main frame, standards having coverers, said standards being connected pivotally with the main frame, a seat-bar supported by said main frame, an auxiliary frame connected pivotally with the main frame, links connecting said seat-bar with the sides of the frame, a seat supported upon the seat-bar, a loop upon the under side of said seat, and supporting-springs connecting said link with the pivoted coverer-standards.

In testimony that I claim the foregoing as my own I have hereto affixed my signature in the presence of two witnesses.

CHARLES L. FERRIOTT.

Witnesses:
  J. V. MORRIS,
  F. W. BURLESON.